United States Patent [19]
Gottlieb

[11] Patent Number: 5,263,402
[45] Date of Patent: Nov. 23, 1993

[54] LIFT/SLIDER APPARATUS

[76] Inventor: Nathan Gottlieb, 5452 Fairway Ct., West Bloomfield, Mich. 48323

[21] Appl. No.: 888,881

[22] Filed: May 26, 1992

[51] Int. Cl.⁵ .............................................. F01B 7/20
[52] U.S. Cl. ..................................... 92/53; 91/167 R; 91/173; 92/151
[58] Field of Search ................ 91/167 R, 170 R, 173, 91/176, 508, 515, 535; 92/53, 61, 151

[56] References Cited

U.S. PATENT DOCUMENTS

| | | | |
|---|---|---|---|
| 2,231,242 | 2/1941 | Barrett | 92/53 |
| 2,474,336 | 6/1949 | Stone | 92/61 |
| 2,910,490 | 10/1959 | Calder | 92/53 |
| 3,314,683 | 4/1967 | Schmidt et al. | |
| 3,642,289 | 2/1972 | Basham et al. | |
| 3,806,134 | 4/1974 | Schexnayder | |
| 4,020,745 | 5/1977 | Iijima et al. | |
| 4,456,077 | 6/1984 | Lagerstedt et al. | |
| 4,507,045 | 3/1985 | Valentine et al. | 92/165 PR |
| 4,511,276 | 4/1985 | Doutt | |
| 4,741,246 | 5/1988 | Padarev | 91/173 |
| 4,829,880 | 5/1989 | Lieberman | |
| 4,866,938 | 9/1989 | Keegan et al. | |
| 4,898,080 | 2/1990 | Lieberman | |
| 4,907,491 | 3/1990 | Filip | |
| 5,111,733 | 5/1992 | Baraniak | 91/173 |

FOREIGN PATENT DOCUMENTS

| | | | |
|---|---|---|---|
| 1150058 | 4/1985 | U.S.S.R. | 91/508 |
| 949894 | 2/1964 | United Kingdom | 91/173 |

*Primary Examiner*—Edward K. Look
*Assistant Examiner*—F. Daniel Lopez
*Attorney, Agent, or Firm*—Harness, Dickey & Pierce

[57] ABSTRACT

This invention relates to a displacing apparatus comprising a plurality of concentric tubular members concentrically disposed about a central axial member. These concentric members define a plurality of substantially closed chambers between adjacent concentric members. A piston member is disposed within each chamber and extends generally radially between two adjacent concentric members thereby dividing each chamber into first and second portions. Each of these piston members is rigidly affixed to one, and sealingly engaged with the other, of the two adjacent concentric members forming a chamber. An actuating means actuates each of the concentric members which has a piston member rigidly affixed thereto. The actuating means selectively provides pressure or vacuum to the first and second portions of each of the chambers creating pressure differentials across the piston members. Pressure differentials across the piston members causes relative displacement between the piston members and the adjacent concentric members sealingly engaged therewith.

19 Claims, 4 Drawing Sheets

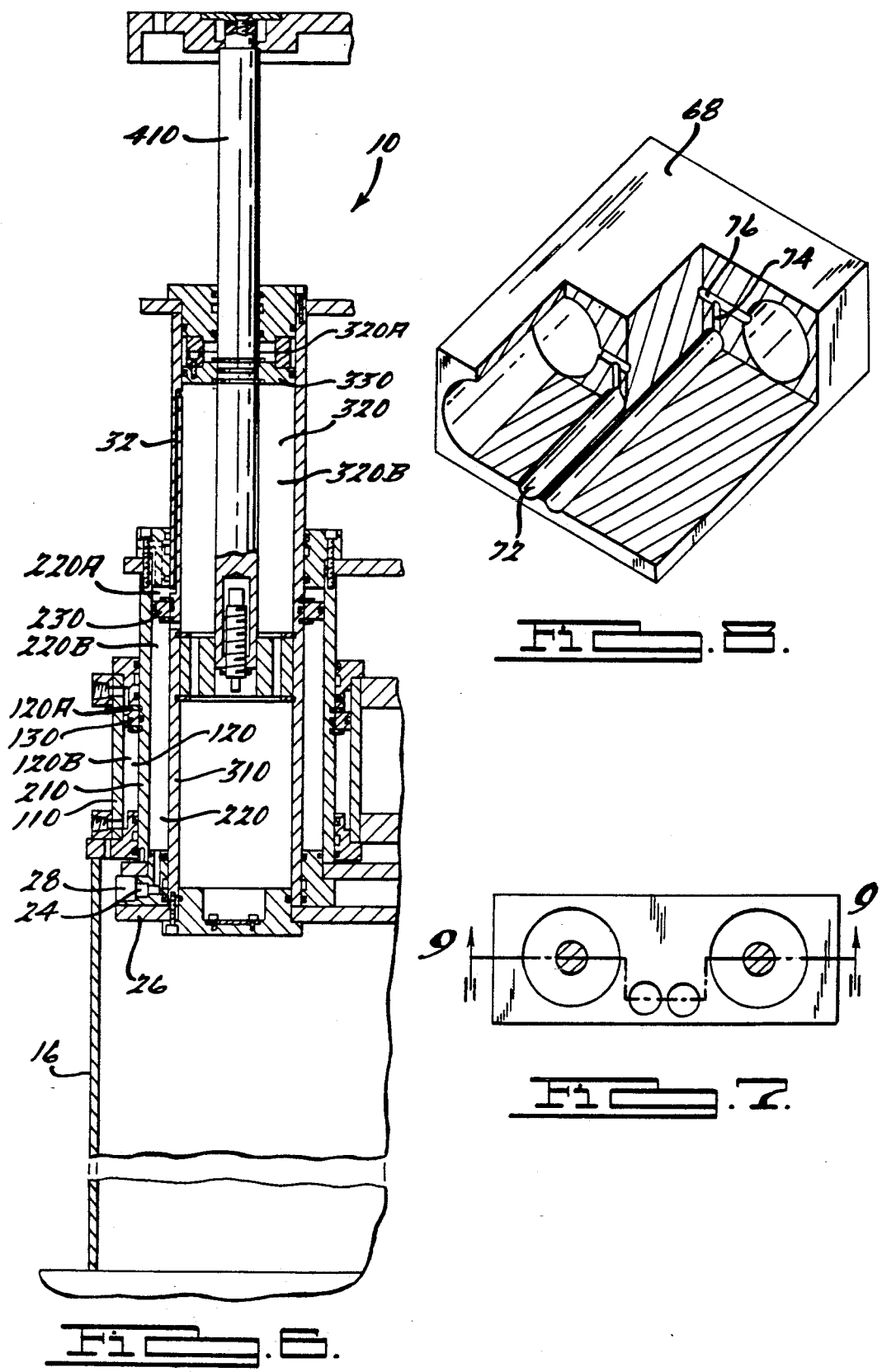

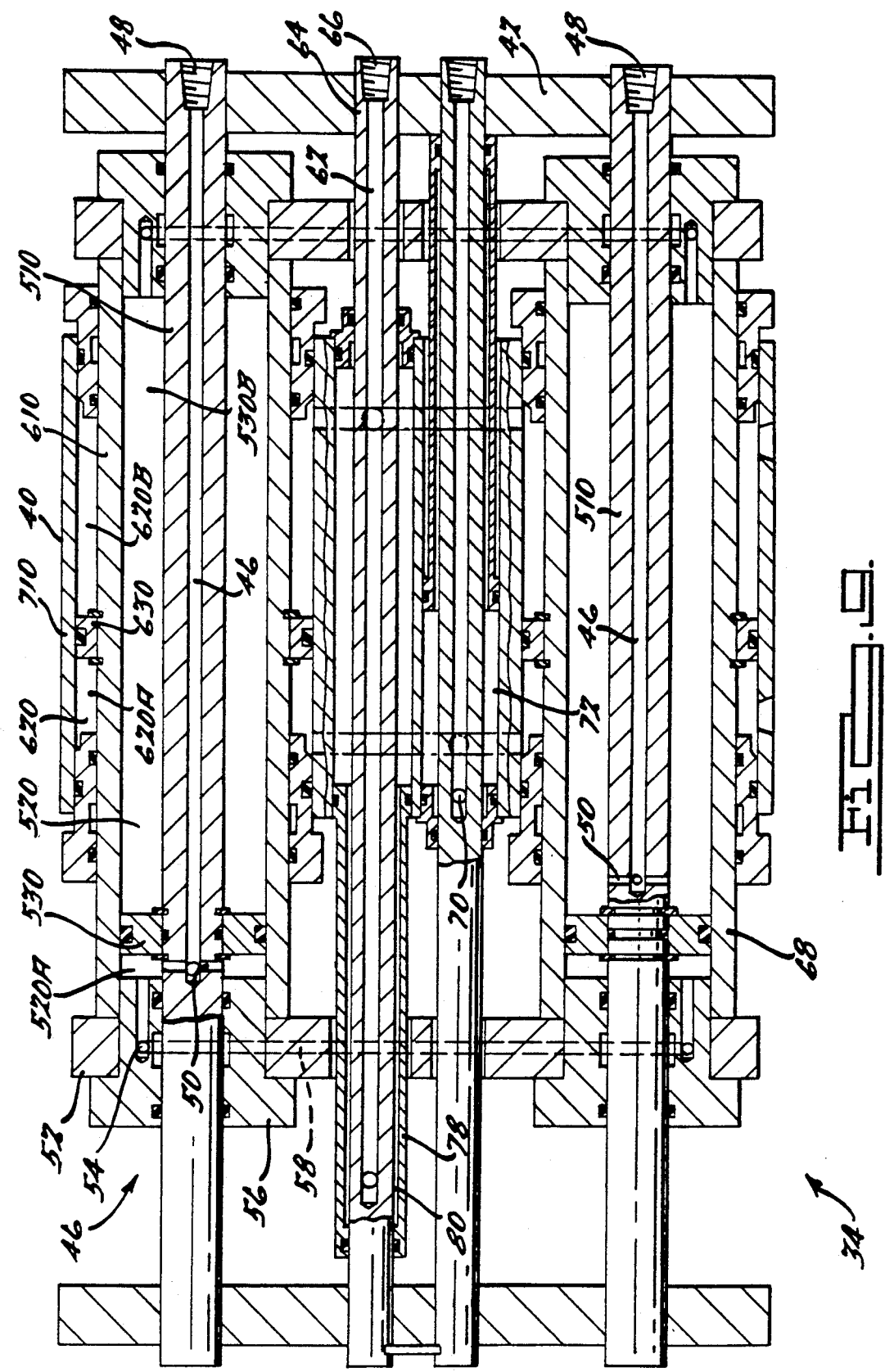

LIFT/SLIDER APPARATUS

BACKGROUND AND SUMMARY

This invention relates generally to lift and slide devices and more particularly to multicylinder concentric lifts and slides utilized in various applications including manufacturing processes.

Typically, lift and slide devices are comprised of a single cylinder and a double acting piston, within the cylinder, that is integrally connected to a pushrod. This type of device is illustrated in U.S. Pat. No. 3,994,539, issued to Gottlieb on Nov. 30, 1976 entitled "Self Contained Activated Slide Apparatus and Method of Constructing and Utilizing Same", which is incorporated herein by reference. Hydraulic or pneumatic pressure is applied to either side of the piston, thereby creating a pressure differential across the piston. This pressure differential forces the piston and the pushrod to displace within the cylinder until the pressure on both sides of the piston is equal (i.e., until equilibrium is achieved). The displacement, or "stroke", of the pushrod is generally limited to the distance that the piston can displace within the cylinder. Thus, in order to increase the overall stroke for a particular application, two cylinder housings which contain the pistons have traditionally been attached to each other, or "piggy backed", to one another. This effectively doubles the stroke, since two devices are connected in series, however, the loads on each cylinder do not coincide. Accordingly, a moment is created which can result in distortion of the cylinder and impede displacement of the piston.

Alternatively, the overall stroke can be increased if lift or slide devices are attached to one another end to end, and in this configuration the forces on the cylinders do coincide. However, when this configuration is collapsed, it is double the length of the piggy backed configuration and therefore is less desirable in today's compact manufacturing facilities. To avert the above mentioned shortcomings, the present invention has a novel configuration that utilizes multiple cylinders and pistons. These components are preferably concentric to allow telescoping like actuation of multiple pistons.

Accordingly, one advantage of the present invention is that moments are not imparted upon the lift or slide device, thereby preventing distortion of the cylinder which could seize the piston.

Another advantage of the present invention is its ability to collapse into a very compact configuration by utilizing multiple concentric pistons and cylinders to create telescoping type actuation.

Yet another advantage of the present invention is the novel transport of a pneumatic or hydraulic medium into multiple cylinders via either stationary or moving coupling ports.

Additional objects, advantages, and features of the present invention will become apparent from the following description and appended claims, taken in conjunction with the accompanying drawings.

BRIEF DESCRIPTION OF THE DRAWINGS

FIG. 3 is a perspective view of one embodiment of a slide device of the present invention shown in a position where the block is completely displaced to the right;

FIG. 4 is a perspective view of one embodiment of a slide device of the present invention shown in a position where the block is completely displaced to the left;

FIG. 5 is a cross sectional view of one of the telescopic actuators shown in the lift device of FIG. 1 illustrating four concentric members in a fully retracted position in accordance with the principles of the present invention;

FIG. 6 is a cross sectional view of the telescopic actuating cylinder shown in FIG. 5 illustrating the four concentric members in an extended or raised position in accordance with the principles of the present invention;

FIG. 7 is an end view of one embodiment of the slide device illustrated in FIGS. 3 and 4;

FIG. 8 is a perspective view of a block portion of one embodiment of a slide device of the present invention, with portions of the block cutaway, thereby illustrating passages within the block for transporting a pressure medium; and FIG. 9 is a cross sectional view of one embodiment of a slide of the present invention illustrating the components of the device.

DETAILED DESCRIPTION OF THE PREFERRED EMBODIMENT

Figure 1:
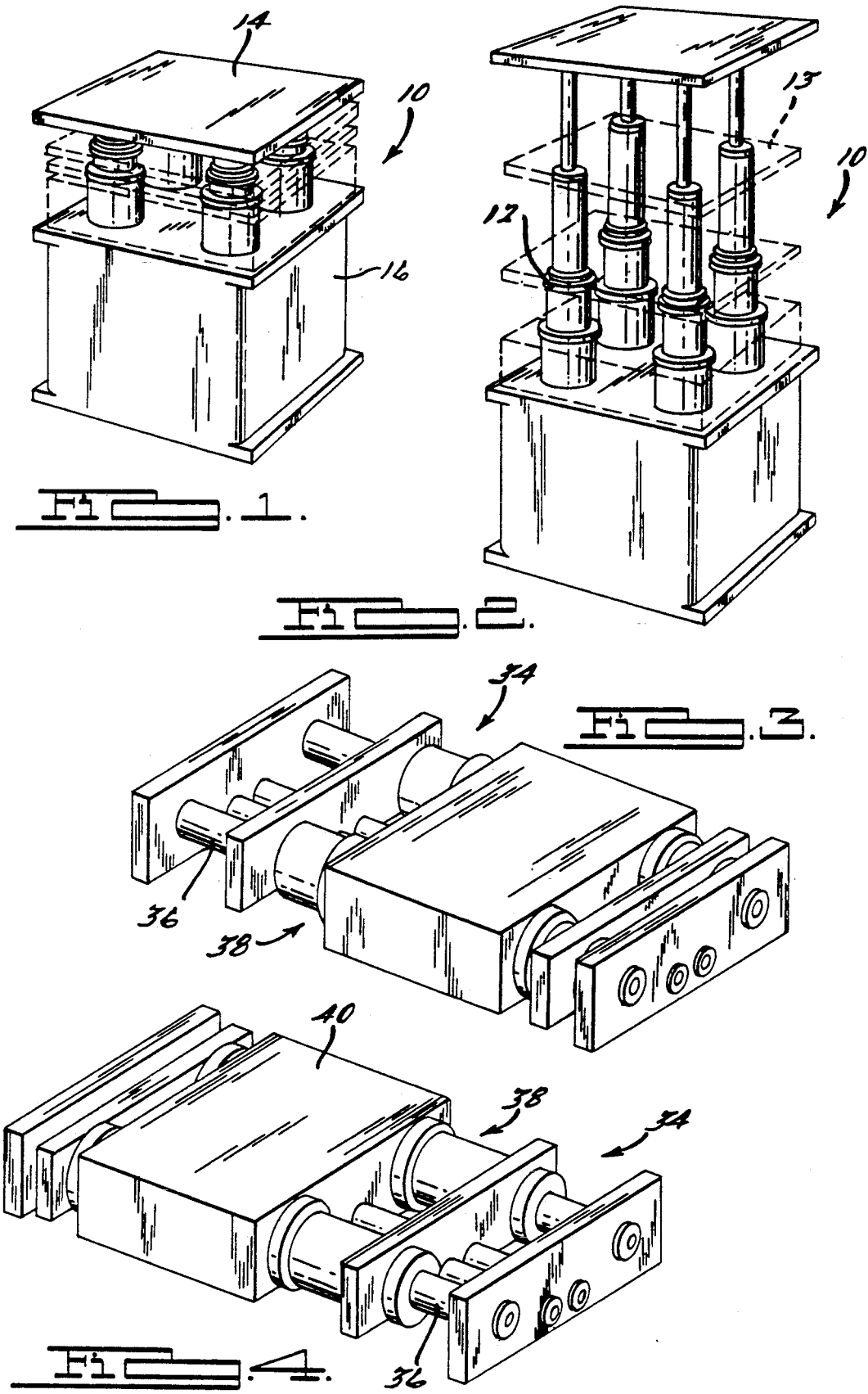
FIG. 1 is a perspective view of one embodiment of a lift device of the present invention shown in a fully retracted position.
Figure 2:
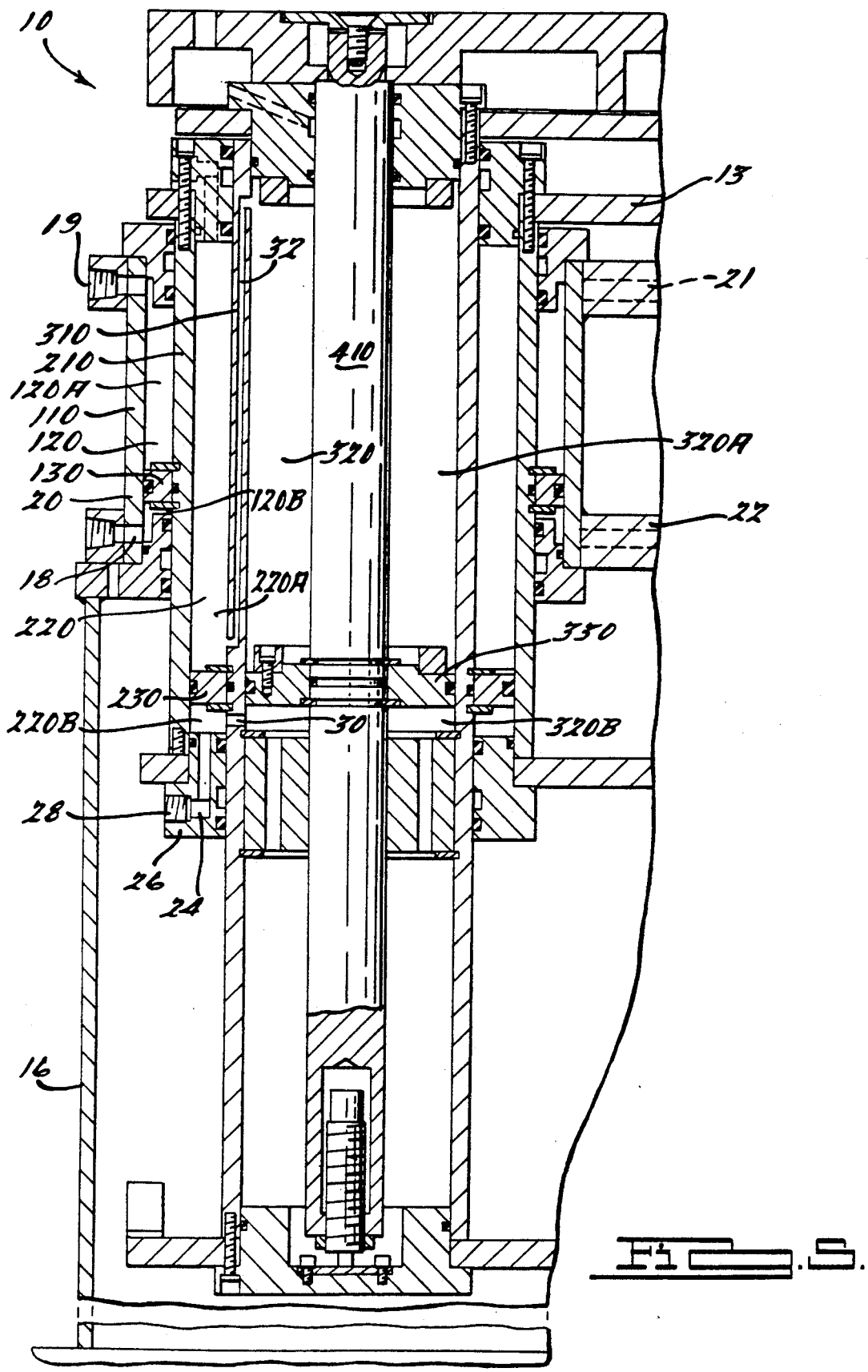
FIG. 2 is a perspective view of one embodiment of a lift device of the present invention shown in a fully raised position.

Referring now to the drawings, and more particularly to FIGS. 1 and 2, FIG. 1 illustrates a lift device 10 in a fully retracted position and FIG. 2 illustrates the lift in a fully raised position. This lift utilizes a plurality of telescoping actuators 12 coupled to one another by tie plates 13 to raise a lift table 14 from its retracted position adjacent to the base 16 of the lift. In this particular embodiment, four telescoping actuators 12 telescope upwardly, raising the lift table 14 from the base 16 of the lift. The tie plates 13 add rigidity and stability to the four telescoping actuators 12 as the lift table 14 is raised by the actuators 12 in unison.

FIGS. 5 and 6 are cross sectional views of a portion of the lift shown in FIGS. 1 and 2; FIG. 5 is a cross section of the lift device 10 in its retracted position and FIG. 6 is a cross section of the lift device 10 in its raised position. Generally, the telescoping action of the lift is accomplished by placing members concentrically about one another such that generally annular cylinders are formed between the members. A generally annular piston is disposed within each of these cylinders dividing each cylinder into two chambers. These pistons, such as the outermost piston 130 in FIG. 5, are rigidly affixed to one of the concentric members 210. The piston 130 extends radially from that concentric member 210, across the cylinder 120, until the opposite end of the piston 130 sealingly engages with the adjacent concentric member 110. A pressure medium is then introduced into the chambers on either side of the piston to create a pressure differential across the piston 130. The pressure differential across the piston 130 exerts a net axial force on the piston 130, causing the piston 130 to displace, thereby displacing the concentric member 210, rigidly affixed to the piston 130, relative to the adjacent concentric member 110. This unique configuration for achieving telescopic actuation is common to the novel lift and slide devices described herein.

The embodiment shown in FIGS. 5 and 6 utilizes four generally rigid concentric members, a stationary outer concentric member 110 attached to the floor, an actuating outer concentric member 210, an actuating middle concentric member 310 and an actuating inner concentric member 410. These members define three generally annular concentric cylinders between the concentric members, an outer cylinder 120, a middle cylinder 220 and an inner cylinder 320. Piston members 130, 230 and 330 are disposed in each of the cylinders 120, 220 and 320 thereby dividing each cylinder into upper 120A, 220A and 320A and lower 120B, 220B and 320B chambers. Each of these pistons is rigidly affixed to the inwardly adjacent concentric member and is sealingly engaged with the outwardly adjacent concentric member. Thus, when a pressure medium, such as a hydraulic or pneumatic fluid, is introduced into the upper and lower chambers, a pressure differential is created across the piston. This pressure differential imposes a net axial load on the piston causing it to displace upward or downward, as discussed above.

Introduction of a pressure medium to impose pressure differentials across, and actuate, the pistons is accomplished by a variety of novel configurations. FIG. 5 shows the lift 10 With all pistons 130, 230 and 330 completely displaced downward and FIG. 6 shows all pistons 120, 230 and 330 completely displaced upward. Referring first to FIG. 5, a pressure medium is introduced into the upper 120A and lower 120B chambers in the outer cylinder 120 via passages 18 through the outer concentric member wall 20. An outside pressure source (not shown) is coupled to these passages 18 through ports 19 in a stationary plate 22. In general plates 22 are used to transport a pressure medium from an outside source, into one inlet port, through a passage 21 in the plate 22 and into corresponding chambers in each of the four telescoping actuators 12. This particular plate 22 supplies a pressure medium to the upper chamber 120A in each outer cylinder 120 of the lift 10.

Pressure medium is introduced into the lower chambers 220B and 320B of both the middle and inner cylinders 220 and 320 via a passage 24 through a bearing 26 that supports the middle concentric member 310. An outside pressure source (not shown) is coupled to a port 28 in the bearing 26 and is thereby in communication with the passage 24 leading into the lower chamber 220B of the middle cylinder 220. Thus, pressure medium passes into the port 28, through the passage 24 and into the lower chamber 220B of the middle cylinder 220. The pressure medium then passes through an aperture 30 in the middle concentric member 310 and enters the lower chamber 320B of the inner cylinder 320.

Pressure medium is introduced into the upper chambers 220A and 320A in the middle and inner cylinders 220 and 320 in a virtually identical manner. The only difference is that the upper chambers 220A and 320A in the middle and inner cylinders 220 and 320 are connected by an elongated galley 32 rather than an aperture 30 in the middle concentric member 310. Note, since the middle and inner cylinders 220 and 320 are in direct communication with one another, both will simultaneously be displaced. The outer cylinder 120, on the other hand, is individually actuated, and therefore displacement of the outer concentric member 210 can be individually controlled.

To accommodate axial displacement of the pistons and concentric members, conventional bearings and seals are necessary, as shown in FIGS. 5 and 6. The bearings support radial loads while permitting axial movement of the concentric members. Bearings also serve the purpose of defining the closed ends of the cylinders and can be used to provide passages for flow of the pressure medium. The seals, on the other hand, are used to maintain pressure in the cylinders by preventing pressure medium from escaping the cylinders. Seals are also used to prevent the escape of pressure medium from chamber to chamber within the cylinder. One of ordinary skill in the art would also certainly recognize that various conventional dampers and stops can also be utilized to accommodate this axial movement. The damper shown between the inner and middle concentric members 410 and 310, and the adjustable stop shown near the bottom of middle concentric member 310, are fairly typical.

The basic principles of the above described lift device also generally apply to slide devices as illustrated in FIGS. 3 and 4. FIG. 3 shows a slide 34 with a stationary inner concentric member 36 and the telescoping concentric members 38 actuated to the right. FIG. 4 shows the slide 34 with telescoping concentric members 38 actuated to the left. The basic principle of a slide 34 is the ability to provide translational movement, while the basic principles of a lift 10 is to provide vertical movement. Thus, one feature of the slide shown in FIGS. 3 and 4, that is different than the lift 10 shown in FIGS. 1 and 2, is that the inner concentric member 36 is fixed and the outer concentric members 38 are telescopically actuated back and forth on the inner concentric member 36. Typically, the outermost concentric member is considered a carriage or saddle 40 and actually provides the translational movement. For example, a welding apparatus (not shown) may be attached to the saddle 40 and driven translationally by telescopically actuating the outer concentric members 38.

FIGS. 7, 8 and 9 illustrate one particular embodiment of a slide having three rigid concentric members, a stationary inner concentric member 510, a middle concentric member 610 and an outer concentric member 710. These concentric members define two generally annular concentric cylinders, an inner cylinder 520 and an outer cylinder 620. Piston members 530 and 630 are disposed in each of the cylinders 520 and 620, thereby dividing each cylinder into left 520A and 620A and right chambers 520B and 620B. Each of these pistons 530 and 630 is rigidly affixed to the inwardly adjacent concentric member and is sealingly engaged with the outwardly adjacent concentric member. Thus, when a pressure medium is introduced, a pressure differential is created across the pistons 530 and 630 causing relative displacement between the pistons and the concentric members in accordance with the principles described above. Note, as with the lift device previously described, the embodiment shown in FIG. 9 utilizes a variety of bearings and seals, along with stops and dampers to accommodate actuation of the concentric members 510, 610 and 710.

This particular slide 34 utilizes a novel configuration of passages that allows the outside pressure source to be coupled only to stationary portions 42 of the slide 34. Therefore, this novel configuration avoids the wear and tear experienced by hoses or the like that might otherwise be connected to moving portions of the slide 34. To illustrate this novel configuration a cross section, shown in FIG. 7, has been taken through the slide. This will illustrate the novel configuration of passages for supplying a pressure medium to the various chambers. Since the passages run three-dimensionally within the slide, the cutaway perspective view in FIG. 8 of the outer concentric member has also been provided.

Referring now to FIG. 9, two telescopic actuators 44 are shown side by side in a parallel configuration. Although this embodiment only uses two actuators 44, one of ordinary skill in the art would recognize that any number could be used depending on the design requirements. In this embodiment, a pressure medium is introduced into the inner cylinder chambers 520A and 520B by elongated passages 46 extending through the stationary inner concentric member 510. An outside pressure source (not shown) is coupled to a port 48 in the end of the inner concentric member 510. This port 48 couples the outside pressure source to the elongated passage 46 in the inner concentric member 510. The elongated passage 46 communicates with a bore 50 that leads into the inner cylinder 520, thereby pressurizing the chamber 520A.

The pressure medium in that chamber 520A is in communication with an identical chamber 520A on the other telescopic actuator 44 via a plate 52. Pressure medium in the chamber 520A passes through a passage 54 in an end bearing 56 and into a galley 58 in the plate 52. The galley 58 is coupled to an identical bearing 56 on the other telescopic actuator 44. Thus, the galley 58 in the plate 52 communicates with a passage 54 in this bearing 56 which in turn communicates with the corresponding chamber 520A in the second telescopic actuator 44. Thus, a pressure medium is introduced to corresponding chambers 520A within both actuators 44 to provide simultaneous actuation of both actuators 44. With regard to the other chambers 520B within the inner cylinders 520, pressure medium is introduced through passage 48 in the other stationary inner concentric member 510 in a substantially identical configuration, as shown in FIG. 9.

Pressure medium can be introduced to the outer cylinders 620 through alternative moving ports 60 passing directly through the wall of the outer concentric member 710. Preferably, however, pressure medium is introduced through passages and galleys as can be seen from FIGS. 8 and 9. The outside pressure source is coupled to a passage 62 within a rod member 64 via a stationary port 66 on the end of the rod 64. This rod 64 passes through a generally solid block 68 which makes up the outer concentric member 710 for each f the actuators 44. Note that this block 68 is shown in FIG. 8 with portions cutaway.

Pressure medium passes through the port 66 and into the passage 62 within the rod 64 before it exits the rod 64 through a bore 70. The pressure medium then enters into an annular chamber 72 formed between the rod 64 and the block 68. The outer surface of this chamber 72, which is defined by the block 68, is shown in FIG. 8 to communicate with a generally vertical passage 74 that extends upwardly to a generally horizontal galley 76. This galley 76 extends horizontally through the block 68 between corresponding chambers in the outer cylinders 620 of each of the telescopic actuators 44. Accordingly, corresponding chambers within the outer cylinders 620 of the actuators 44 are pressurized by an outside pressure source that is coupled to one stationary port 66 on the slide 34.

Note that the bore 70 extending from the passage 62 within the rod 64 to the annular chamber 72 around the rod 64 is fixed since the rod 64 is fixed. Therefore, if the block 68 is actuated such that the annular chamber 72 between the block 68 and the rod 64 travels beyond the bore 70 extending from the rod 64, the pressure medium in the passage 62 within the rod 64 is no longer in communication with the annular chamber 72 around the rod 64. Thus, the pressure medium is isolated from chambers 620A and 620B within the outer cylinder 620. To solve this problem, and thereby allow for greater stroke of the block 68, a sleeve 78 is placed between the block 68 and the rod 64. This sleeve 78 has a greater inside diameter than the outer diameter of the rod 64, therefore, an annular chamber 80 is formed between the sleeve 78 and the rod 64.

This annular chamber 80 is in communication with both the bore 70 in the rod 64 and the annular chamber 72 between the block 68 and the rod 64. Since the sleeve 78 generally maintains its position with respect to the rod 64 as the block 68 is actuated, the bore 70 constantly communicates with the annular chamber 80 within the sleeve 78 which in turn communicates with the annular chamber 72 between the block 68 and the rod 64. Accordingly, even if the block 68 is actuated beyond the bore 70 in the rod 64, the sleeve 78 effectively lengthens the annular chamber 72. Thus, the annular chambers 72 and 80 continue to communicate with the vertical and horizontal galleys 74 and 76 leading to the chambers 620A and 620B within the cylinders 620. This feature effectively increases the stroke of the block 68.

One of ordinary skill in the art would certainly recognize that various outside pressure sources could be utilized to provide pressure and vacuum for either lift 10 or slide devices 34 in accordance with the principles of this invention. Any number of devices currently on the market can be utilized to selectively pressurize chambers within the cylinders such that accurate displacement of the lift table 14 and/or the saddle 40 can be achieved.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A displacing apparatus comprising:
   (a) a plurality of tubular members, each of said tubular members having an axial axis, and each of said axial axes being substantially parallel to one another, said tubular members being disposed radially adjacent to one another thereby defining a plurality of substantially closed chambers;
   (b) a plurality of piston members, one of said piston members being disposed within each of said chambers, thereby dividing each of said chambers into first and second portions;
   (c) a pressure medium transporting member disposed exterior to said plurality of tubular members, said transporting member having a first passage defined therein which communicates with at least one of said chambers, said pressure medium transporting member slidingly engaging a portion of said displacing apparatus such that a second passage is defined between said transporting member and another portion of said displacing apparatus; and
   (d) pressurizing means in communication with said first and second passages for selectively pressurizing each of said first and second portions of said chambers thereby creating pressure differentials across said piston members and causing relative displacement between said piston members and said tubular members.

2. The displacing apparatus of claim 1 wherein said pressurizing means applies pressure of vacuum to any of said individual first and second portions of said chambers, thereby controlling relative displacement between individual piston members and individual tubular members.

3. The displacing apparatus of claim 1 wherein said pressurizing means is coupled to ports, within the tubular members, that communicate with said first and second portions of said chambers.

4. The displacing apparatus of claim 1 wherein said passages communicate with at least one of said chambers via sleeve means that extend the effective length of said passages as said pistons and said tubular members are displaced relative to one another.

5. The displacing apparatus of claim 4 wherein said pressure medium transporting member slidingly engages said sleeve means such that a gap is created therebetween, said gap providing communication between said first and second passages.

6. The displacing apparatus of claim 1 wherein pressure medium transporting member is stationary and said plurality of tubular members are displaced relative thereto.

7. The displacing apparatus of claim 1 wherein said pressurizing means is coupled to a stationary portion of said displacing apparatus.

8. The displacing apparatus of claim 1 wherein said pressurizing means is coupled to a movable portion of said displacing apparatus.

9. The displacing apparatus of claim 1 wherein at least one of said plurality of tubular members is stationary and said pressure medium transporting member is displaced relative thereto.

10. The displacing apparatus of claim 1 wherein a plurality of said displacing apparatus are used in a parallel configuration such that said plurality of displacing apparatus uniformly move in concert.

11. A displacing apparatus comprising:
(a) a plurality of concentric members comprised of a plurality of tubular members concentrically disposed about a central axial member thereby defining a plurality of substantially closed elongated annular chambers between said concentric members, said axial member defining an interior passage in communication with at least one of said chamber;
(b) a plurality of piston members within said chambers, each of said piston members extending generally radially between two adjacent concentric members thereby dividing said chamber between said two adjacent concentric members into first and second portions, each of said piston members being rigidly affixed to one, and sealingly engaged with the other, of said two adjacent concentric members;
(c) at least one guide rod defining an interior passage, said guide rod disposed exterior to said concentric members and slidingly engaging a portion of said displacing apparatus having a passage in communication with at least one of said chambers; and
(d) actuating means for actuating each of said piston members, thereby actuating said concentric members rigidly affixed thereto, said actuating means selectively providing pressure or vacuum to said first and second portions of each of said chambers through said interior passages within said axial member and said guide rod, thereby selectively creating pressure differentials across said piston members causing relative displacement between said piston member and said adjacent concentric member sealingly engaged therewith.

12. The displacing apparatus of claim 11 wherein said guide rod slidingly engages a sleeve member such that a gap is created therebetween, said gap providing communication between said inner passage within said guide rod and at least one of said chambers.

13. The displacing apparatus of claim 11 wherein said actuating means is coupled to ports, within the tubular members, that communicate with said first and second portions of said chambers.

14. The displacing apparatus of claim 11 wherein said central axial member is stationary and said plurality of tubular members are displaced relative thereto.

15. The displacing apparatus of claim 11 wherein said actuating means is coupled to a stationary portion of said displacing apparatus.

16. The displacing apparatus of claim 11 wherein said actuating means is coupled to a movable portion of said displacing apparatus.

17. The displacing apparatus of claim 11 wherein a plurality of said displacing apparatus are used in a parallel configuration such that said plurality of displacing apparatus move in unison.

18. The displacing apparatus of claim 17 wherein said plurality of displacing apparatuses are coupled to one another by plates through which said actuating means communicates with said chambers within each of said plurality of displacing apparatuses.

19. A displacing apparatus comprising:
(a) first inner and outer concentric tubular members disposed about a first central axial member, said tubular members and said axial member being in a radially spaced relationship with one another thereby defining a first elongated annular chamber between said inner and outer tubular members and a second elongated annular chamber between said axial member and the inner tubular member, said axial member defining an interior passage therein in communication with at least one of said chambers;
(b) second inner and outer concentric tubular members disposed about a second central axial member, said tubular members and said axial member being in a radially spaced relationship with one another thereby defining a first elongated annular chamber between said inner and outer tubular members and a second elongated annular chamber between said axial member and the inner tubular member, said axial member defining an interior passage therein in communication with at least one of said chambers;
(c) a plurality of annular piston members, one of said piston members being disposed within each of said chambers such that said piston members extend radially within said annular chambers, thereby dividing said chambers into first and second portions, each of said piston members being rigidly affixed to one, and sealingly engaged with the other, of said members defining said annular chambers;
(d) a rigid coupling member affixed to said first and second outer tubular members;
(e) a pair of guide rods slidingly engaging said rigid coupling member, each of said guide rods defining an interior passage therein which communicates with at least one of said chambers through passages defined by said rigid coupling member; and (f) actuating means for selectively providing pressure or vacuum to said first and second portions of each of said chambers through said interior passages within said axial members of said guide rods, thereby selectively creating pressure differentials across said piston members causing relative displacement between said piston member and said adjacent member sealingly engaged therewith.

* * * * *